July 24, 1928.
F. G. CRANE
SLITTING MACHINE
Filed Nov. 7, 1927
1,677,915
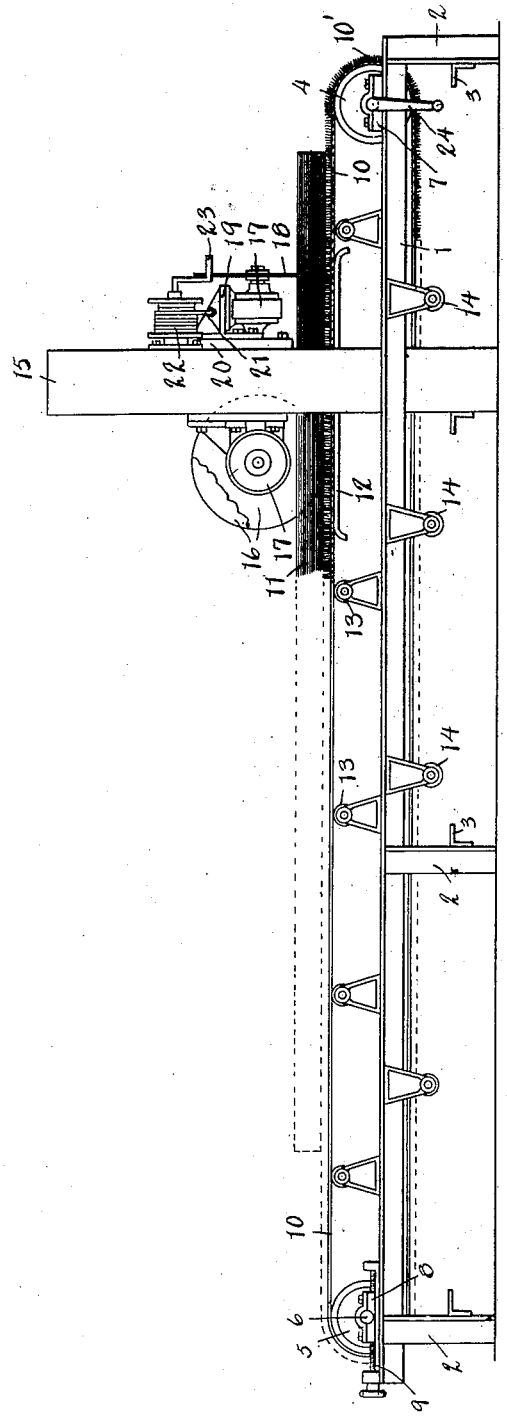
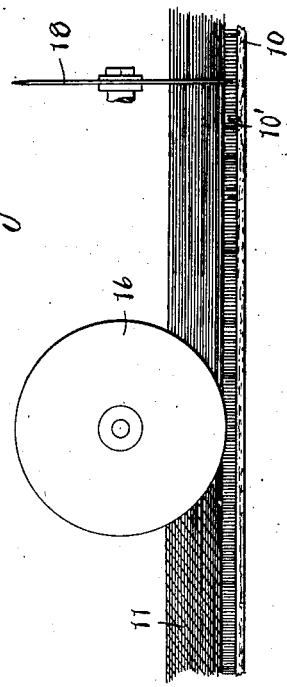
INVENTOR
Frank G. Crane
BY Chappell Earl
ATTORNEYS Patented July 24, 1928.

1,677,915

UNITED STATES PATENT OFFICE.

FRANK G. CRANE, OF MONTAGUE, MICHIGAN, ASSIGNOR OF ONE-HALF TO DETROIT SULPHITE PULP & PAPER CO., OF DETROIT, MICHIGAN.

SLITTING MACHINE.

Application filed November 7, 1927. Serial No. 231,582.

Considerable difficulty has been experienced in the cutting of materials of a loose or fluffy character with clean edges into units of uniform dimensions.

It is the main object of this invention to provide a machine by means of which loose or fluffy materials may be effectively and rapidly cut into the desired units as the same are commonly produced in the mill.

Objects relating to details and economies of my invention will appear from the detailed description to follow. The invention is defined and pointed out in the claims.

A structure which is a preferred embodiment of my invention is illustrated in the accompanying drawing, forming a part of this application, in which:

Fig. 1 is a side elevation of a cutting machine embodying the feature of my invention, the parts being shown mainly in conventional form, the material also being conventionally illustrated.

Fig. 2 is an enlarged fragmentary view showing the relation of the material to the conveyor apron and rotary cutters as the material is cut or slitted.

In the drawing similar reference characters refer to similar parts throughout the views.

Referring to the drawing, the machine, in the embodiment illustrated, comprises a frame made up of longitudinal bed members which are supported by legs or standards 2, these standards being connected by cross pieces 3. These parts are conventionally shown.

Adjacent the ends of the bed members are apron supporting and driving rollers 4 and 5, these rollers being provided with shafts 6 supported in bearings 7 and 8, the bearing 8 being adjustably supported as by means of the screw 9 for tensioning the apron.

The apron 10 is provided with a nap or pile 10' constituting the face of the apron, this nap or pile being formed of closely arranged fibres, preferably of wool, and being of sufficient stiffness to support the work with the fibres in approximately erect position as indicated in the drawing, the work 11 illustrated being a conventional illustration of a material made up of a plurality of layers of thin crepe tissue.

The upper reach of the conveyor is supported by the table 12 and a plurality of spaced rollers 13 arranged in the horizontal plane of the table. The lower reach of the conveyor is supported by a plurality of spaced rollers 14.

At the sides of the table are uprights 15 carrying a plurality of rotary cutters 16, each provided with a motor conventionally shown at 17. These motors are preferably electric motors, the wiring therefor not being illustrated.

At the rear of the longitudinal slitting cutters 16 is a transverse rotary slitting cutter 18, also provided with a driving motor 17. This transverse cutter is mounted on a carriage 19 slidable on the way 20. The details of the carriage and way are not illustrated as they form no part of this invention.

The carriage 19 is reciprocated by means of a cable 21 and winding drum 22 provided with a crank 23.

The cutters are arranged so that their peripheries enter or extend into the pile of the apron but do not reach the body of the apron—see Fig. 2. The result is that the work is supported by the fibres so that the work is not slit on the conveyor, the fibres taking an effective hold on the work as well as supporting it so that the cutters extend or cut entirely through the work.

In the embodiment illustrated, the conveyor roller 4 is provided with a crank 24 by means of which the conveyor is actuated step by step, carrying the work past the rotary cutters 16 whereby the work is longitudinally slit, the conveyor being stopped at suitable intervals and the transverse slitter operated to sever the several strips resulting from the longitudinal slitters into suitable lengths.

I have, as stated, shown my improvements mainly in conventional form but it is believed that the structure thereof will be clearly understood.

I have not attempted to illustrate or describe certain modifications and adaptations which I contemplate as it is believed that this disclosure made will enable those skilled in the art to embody or adapt my improvements as may be desired.

Having thus described my invention, what I claim as new and desire to secure by Letters Patent, is:

1. In a machine of the class described, the combination of conveyor apron supporting and driving rollers, a conveyor apron having a pile-like face of closely arranged fibres of sufficient stiffness to support the work with the fibres in approximately erect position, an apron supporting table arranged between said rollers, said apron being substantially longer than said table, a plurality of spaced apron supporting rollers disposed in a horizontal plane of said table to coact therewith in supporting the upper reach of said apron, longitudinal slitting rotary cutters disposed in spaced relation above said table, and a cross slitting rotary cutter mounted to reciprocate transversely above said apron at the rear of said longitudinal slitting cutters, said cutters being provided with individual driving motors and being positioned relative to said apron so that their peripheries extend into the pile but are spaced from the body of the apron.

2. In a machine of the class described, the combination of a conveyor apron supporting and driving rollers, a conveyor apron having a pile-like face of closely arranged fibres of sufficient stiffness to support the work with the fibres in approximately erect position, an apron supporting table arranged between said rollers, longitudinal slitting rotary cutters disposed in spaced relation above said table, and a cross slitting rotary cutter mounted to reciprocate transversely above said apron at the rear of said longitudinal slitting cutters, said cutters being provided with individual driving motors and being positioned relative to said apron so that their peripheries extend into the pile but are spaced from the body of the apron.

3. In a machine of the class described, the combination of conveyor apron supporting and driving rollers, a conveyor apron having a pile-like face of closely arranged fibres of sufficient stiffness to support the work with the fibres in approximately erect position, an apron supporting table arranged between said rollers, said apron being substantially longer than said table, a plurality of spaced apron supporting rollers disposed in a horizontal plane of said table to coact therewith in supporting the upper reach of said apron, rotary cutters disposed in spaced relation above said table, said cutters being provided with individual driving motors and being positioned relative to said apron so that their peripheries extend into the pile but are spaced from the body of the apron.

4. In a machine of the class described, the combination of conveyor apron supporting and driving rollers, a conveyor apron having a pile-like face of closely arranged fibres of sufficient stiffness to support the work with the fibres in approximately erect position, an apron supporting table arranged between said rollers, rotary cutters disposed in spaced relation above said table, said cutters being provided with individual driving motors and being positioned relative to said apron so that their peripheries extend into the pile but are spaced from the body of the apron.

5. In a machine of the class described, the combination of conveyor apron supporting and driving means, a conveyor apron having a pile-like face of closely arranged fibres of sufficient stiffness to support the work with the fibres in approximately erect position, longitudianl slitting rotary cutters disposed in spaced relation, and a cross slitting rotary cutter mounted to reciprocate transversely at the rear of said longitudinal slitting cutters, said cutters being positioned relative to said apron so that their peripheries extend into the pile but are spaced from the body of the apron.

6. In a machine of the class described, the combination of conveyor apron supporting and driving means, a conveyor apron having a pile-like work supporting face, and a driven rotary cutter positioned relative to said apron so that its periphery extends into the pile but is spaced from the body of the apron.

7. In a machine of the class described, the combination of a work supporting apron having a pile-like face of closely arranged fibres of sufficient stiffness to support the work with the fibres in approximately erect position, a driven rotary cutter, and means for imparting relative movement to said cutter and work supporting apron, said cutter being positioned relative to said apron so that its periphery extends into the pile but is spaced from the body of the apron.

In witness whereof I have hereunto set my hand.

FRANK G. CRANE.